Patented Nov. 5, 1935

2,019,713

UNITED STATES PATENT OFFICE 2,019,713

FERTILIZER AND PROCESS FOR THE PRODUCTION OF THE SAME

Charles Kiddell Lawrence, Syracuse, N. Y., assignor to Atmospheric Nitrogen Corporation, New York, N. Y., a corporation of New York No Drawing. Application October 4, 1932, Serial No. 636,190

3 Claims. (Cl. 71—9)

This invention relates to the production of mixed fertilizers and in particular to the production of a fertilizer containing both nitrogen and phosphorus.

Ammonium nitrate is a valuable fertilizer salt since it contains a high proportion of both ammoniacal and nitrate nitrogen which are readily available to plants. It has, however, the disadvantage that it tends to cake when stored and harden into masses which must be broken up before the material may be distributed in the field. Triple superphosphate is a product obtained by decomposing phosphate rock, which principally consists of tri-calcium phosphate, with phosphoric acid. This treatment renders the phosphate content of the rock available as plant food. It has heretofore been proposed to introduce nitrogen into triple superphosphate by treating it with ammonia. The amount of nitrogen which may thus be added to the triple superphosphate however, is limited by the ability of the phosphate to combine with the ammonia.

I have discovered that a valuable fertilizer containing phosphorus and relatively large amounts of nitrogen may be prepared in a form which is relatively non-hygroscopic and which may be stored without undue caking, by cooling fused ammonium nitrate containing ammoniated triple superphosphate to form solid granules containing the admixed constituents. I have discovered that by dispersing the fluid mixture of ammonium nitrate and triple superphosphate into a cooling gas in the form of droplets which are solidified, the granular product thus obtained retains its granular form and is particularly free from caking during storage and is substantially non-hygroscopic.

The fertilizer of this invention may be made by preparing a fusion consisting of ammonium nitrate and ammoniated triple superphosphate and cooling the fused material to solidify it. The fusion may be cooled upon a flaking drum or in molds to form blocks which are subsequently broken up. In its preferred embodiments, the invention comprises dispersing a fused mixture of ammonium nitrate and ammoniated triple superphosphate in about equal proportions into a cooling gas to solidify the mixture in the form of granules or pebbles. The pebbled material may, if desired, be subjected to a drying stage and is then ready for distribution to the trade.

For a fuller understanding of the nature and objects of this invention, reference should be had to the following detailed example of the preparation of a fertilizer in accordance with the invention. Commercial triple superphosphate prepared by decomposing phosphate rock with phosphoric acid is treated with 30% aqua ammonia in amount sufficient to give a product containing about 4% nitrogen. The ammoniated material is dried to contain about 3% water and is ground. A melt of ammonium nitrate containing about 5 lbs. of water for every 40 lbs. of ammonium nitrate is prepared and the ground ammoniated triple superphosphate is stirred into this melt in the proportions of about 33 lbs. of the ammoniated triple superphosphate to every 40 lbs. of ammonium nitrate. The slurry thus formed at a temperature of about 110° C. is sprayed from a revolving disc into a cooling gas such as air and the solidified pebbled material thus formed is passed through a rotary drier in contact with warm air to dry the pebbles.

The above example is given by way of illustration and this invention is not limited to the specific details of the example. Preferably, in preparing the fertilizers of this invention, the ammonium nitrate and ammoniated triple superphosphate are mixed in the proportions of about 45 to 60 parts of ammonium nitrate to 55 to 40 parts of the ammoniated triple superphosphate. In ammoniating the triple superphosphate which is to be admixed with the ammonium nitrate, ammonia may be added to the triple superphosphate either as aqua ammonia, gaseous ammonia or anhydrous liquid ammonia. If desired, the triple superphosphate may be treated with a solution of ammonium nitrate in anhydrous or aqua ammonia and the resulting product mixed with a desired proportion of ammonium nitrate and heated to form a fluid slurry which may then be pebbled in the manner described above or solidified in any other desired manner. The triple superphosphate may be treated with ammonia in amount sufficient to form an ammoniated product containing from about 1% to 8% nitrogen and the nitrogen content of the final fertilizer prepared in accordance with this invention is increased by the addition to this ammoniated triple superphosphate of ammonium nitrate. The water content of the fluid mixture may be varied, but the presence of some moisture is desirable since the water permits of operating at lower temperatures than would otherwise be possible. This moisture may be present in the triple superphosphate and/or the ammonium nitrate used in making up the fertilizer or it may be separately added with the ammonia used for ammoniating the triple superphosphate. I have found that mixtures of ammonium nitrate and ammoniated triple superphosphate containing from about 1% to 8% water are particularly suitable for the production of a pebbled product by spraying the material at a temperature at which it is a fluid.

Other methods may be employed for preparing a granular fertilizer product in accordance with this invention than that particularly described hereinabove. For example, a mixture of ammonium nitrate and ammoniated triple superphosphate containing a desired proportion of moisture may be granulated by forcing it as a plastic mass through the openings of a screen or perforated plate. Other methods of preparing the ammoniated triple superphosphate mixture may also be employed as, for example, moist triple superphosphate may be mixed with ammonium nitrate and the mixture ammoniated either before or after it is warmed to a temperature suitable for its granulation.

I claim:

1. A fertilizer composition consisting of ammonium nitrate and ammoniated triple superphosphate in the proportions of about 45 to 60 parts of ammonium nitrate to 55 to 40 parts of ammoniated triple superphosphate.

2. A fertilizer composition comprising a solidified fusion of a mixture of ammonium nitrate and ammoniated triple superphosphate in the proportions of 45 to 60 parts of ammonium nitrate to 55 to 40 parts of the ammoniated triple superphosphate.

3. A process for the production of a fertilizer which comprises preparing a fusion of a mixture containing about 45 to 60 parts of ammonium nitrate and 55 to 40 parts of ammoniated triple superphosphate, dispersing the fused mixture at a temperature of about 110° C. into a cooling gas to solidify it in the form of pebbles and drying the pebbled solid material.

CHARLES KIDDELL LAWRENCE.